United States Patent [19]

Mashimo

[11] 4,266,171
[45] May 5, 1981

[54] ADVANCE CONTROL SYSTEM FOR USE IN A DRILLING APPARATUS

[75] Inventor: Tohru Mashimo, Hiroshima, Japan

[73] Assignee: Toyo Kogyo Co., Ltd., Hiroshima, Japan

[21] Appl. No.: 27,013

[22] Filed: Apr. 3, 1979

[30] Foreign Application Priority Data

Apr. 5, 1978 [JP] Japan .................................. 53-40576

[51] Int. Cl.³ .......................................... G05B 19/24
[52] U.S. Cl. .................................. 318/571; 318/603; 173/8; 175/24
[58] Field of Search ............... 318/600, 601, 602, 603, 318/571, 39; 364/474, 475; 173/8; 175/24

[56] References Cited

U.S. PATENT DOCUMENTS

| | | | |
|---|---|---|---|
| 2,729,773 | 1/1956 | Steele | 318/600 |
| 3,399,753 | 9/1968 | Revelle | 318/603 X |
| 3,843,915 | 10/1974 | Helmbold | 318/602 |
| 3,949,286 | 4/1976 | Appelgren | 318/603 X |
| 4,158,799 | 6/1979 | Cappel et al. | 318/603 X |
| 4,160,937 | 7/1979 | Fiorini | 318/571 X |

*Primary Examiner*—B. Dobeck
*Attorney, Agent, or Firm*—Wenderoth, Lind & Ponack

[57] ABSTRACT

A drilling apparatus includes a drilling rod, a feed motor for advancing and retreating the rod in relation to an object to be drilled, and a control system for controlling the movement of the rod. The control system includes a pulse generator for producing one long duration pulse upon completion of each rotation of the drilling rod, an oscillator for producing high frequency pulses, a counter for counting the number of high frequency pulses during the long duration pulse, and a control circuit for controlling the feed motor in response to the counted number of pulses, the control system operating so that the counted number of high frequency pulses equals a predetermined number during the period of the long duration pulse.

The control system is arranged to increase the advancing force of the drilling rod when its rotational speed increases (i.e.-when the counted number of high frequency pulses decrease) and the control system is arranged to decrease the advancing force of the drilling rod when its rotational speed decreases (i.e.-when the counted number of high frequency pulses increase). Thus, the control system stabilizes the rotational speed of the drilling rod by advancing and retreating the rod, thereby optimizing the drilling operation.

5 Claims, 15 Drawing Figures

ADVANCE CONTROL SYSTEM FOR USE IN A DRILLING APPARATUS

BACKGROUND OF THE INVENTION

The present invention relates to an advance control system for use in a drilling apparatus such as rock drilling apparatus.

Generally, a rock drilling apparatus includes, as shown in FIG. 1, a drill 2 slidably mounted on an elongated casing 4 which is generally called a cell. A driving rod 6 extending outwardly from the drill 2 is supported on a support 8 rigidly mounted at one end of the cell 4. The end of the rod 6 remote from the drill 2 is provided with a bit 10 which substantially drills a hole in the rock by the rotation thereof while striking impacts are applied axially to the rod 6. Mechanism for effecting the rotation and applying the impact to the bit 10 through the rod 6 is omitted. The drill 2 has a lower end portion extending into the cell 4 and engaged to a threaded shaft 12 which extends longitudinally and rotatably in the cell 2. The left-hand end of the threaded shaft 12 remote from the end provided with the support 8 is connected to a feed motor M operated by a fluid pressure such as air. When the feed motor M is driven to rotate the shaft 12 in one direction, the drill 2 is forcibly moved in one direction such as the forward direction whereas, when the feed motor M is driven to rotate the shaft 12 in the other direction, the drill 2 is forcibly moved in the other direction such as the reverse direction. It is to be noted that the cell 4 is preferably mounted on a vehicle (not shown) through a suitable boom (not shown).

For carrying out a drilling operation at a constant speed with a constant torque, the advancing force of the drill 2 effected by the motor M should be adjusted to cope with the hardness of the rock. For example, when drilling a hole in a very hard rock or in a clay, the drill 2 is applied with a high advancing force. On the other hand, when drilling a hole in a sandy or soft rock, the drill 2 is applied with a low advancing force. However, in the case of hard rock, if the advancing force exceeds the optimum force, the rotating torque on the rod 6 becomes very high and, at the same time, the rotational speed of the rod 6 becomes small or even equal to zero due to the firm contact between the rock and the bit 10. On the other hand, in the case of soft rock, there will hardly be any drilling resistance from the soft rock and the rod 6 rotates at a very high speed. Therefore, the tip of the bit 10 will be easily worn-out by the abrasion against the rock. In addition, other components of the drill 2 will also be worn-out by the high speed rotation of the rod 6. Therefore, it is preferable to precisely control the operation of the drilling apparatus. Generally, in the drilling apparatus, when the rod is rotated at a very high speed, the rotational speed of the rod has to decrease with the increase of the drill advancing force. On the other hand, when the rod is rotating at a very low speed, the rotational speed of the rod has to increase with the decrease of the drill advancing force. Therefore, in order to stabilize the rotational speed of the rod, it is necessary (i) to detect the rotational speed of the rod; (ii) to increase the advancing force in the case in the increase of the rotational speed; and (iii) to decrease the advancing force in the case of the decrease in the rotational speed. Since the advancing force is in relation to the air pressure supplied to the feed motor M, the advancing force can be controlled by the air pressure supplied to the feed motor M.

From this point of view, there have been proposed various advance control systems for use in a drilling apparatus. One conventional control system detects the exhaust or suction pressure at a rotation sleeve which rotates together with the rod for the continuous detection of the rotational speed of the rod. However, in this control system, there have been such disadvantages that the rotational speed can not be detected with high accuracy and that a nozzle used for detecting the pressure is often choked by dust. Another conventional type of advance control system for use in a drilling apparatus is diagramatically shown in FIG. 2.

In FIG. 2, the conventional control system which is disclosed in the Japanese Laid-Open Utility Model Publication No. 50-121001 published on Oct. 3, 1975 includes a rotary disc 14 coaxially connected to the rod 6 (FIG. 1) and a proximity or contactless switch 16 of any known type positioned closely adjacent the peripheral edge of the disc 14. The disc 14 has a plurality of recesses 14a, (for example, eight as shown in FIG. 2), formed around the peripheral edge portion of the disc 14 at a predetermined pitch. The proximity switch 16 detects the recess 14a and produces a low signal when the recess 14a faces the proximity switch 16. Therefore, the proximity switch 16 produces a train of pulse signals as a result of the rotation of the disc 14. It is understood that the frequency of the pulse signal is in proportion to the speed of rotation of the rod 6. The control system further includes an oscillator 18 which produces a pulse signal having a very long pulse duration. The oscillator 18 is coupled to a synchronizing pulse producing circuit 20 which produces a single shot pulse through a line P1 simultaneously with the leading edge and trailing edge of the pulse from the oscillator 18 and also produces a single shot pulse through a line P2 immediately after the pulse has been produced on the line P1. The synchronizing pulse producing circuit 20 further produces a single shot pulse through a line P3 immediately after the pulse has been produced on the line P2. A counter 22 is provided for counting the number of pulses produced from the proximity switch 16 in a predetermined period of time controlled by the synchronizing pulse producing circuit 20. The counter 22 starts counting the train of pulses from the proximity switch 16 upon receipt of one shot pulse from the synchronizing pulse producing circuit 20 through the line P3. The counting of the pulse in the counter 22 is effected until the counter 22 receives the one shot signal from the synchronizing pulse producing circuit 20 through the line P1. Immediately thereafter, upon receipt of the one shot pulse from the line P2, the counter shifts the counted number of the pulses to a comparator 24. The one shot pulse from the line P2 is also applied to a register 26 for shifting a prearranged number stored in the register 26 to the comparator 24. This prearranged number corresponds to the desired number of pulses to be produced from the proximary switch 16 during the predetermined period of time. In the comparator 24, the number from the counter 22 is compared with the number from the register 26 and the difference therebetween is fed to a control circuit 28 and further to an air pressure control circuit 30. In the case where the number from the counter 22 exceeds the prearranged number from the register 26, it is understood that the bit 10 of the drill is rotating at a speed higher than the required speed. In this case, the control circuit 28 causes the air pressure circuit 30 to provide more pressure to the motor M so that the drill can advance with a greater force. On the other hand, in the case where the number from the counter 22 falls below the prearranged number, it is understood that the bit 10 of the drill is rotating at a speed lower than the required speed. In this case, the control circuit 28 causes the air pressure circuit 30 to provide less pressure to the motor M so that the drill can advance with a less force. In the case where the number from the counter 22 is equal to the prearranged number, the control circuit 28 is so actuated as to maintain the drilling speed at the required speed.

According to the above described system for controlling the advance of the drilling apparatus, the detection of the number of rotation of the disc 14 can be carried out with higher accuracy with the increase of the number of the recesses 14a formed in the disc 14. In view of this, the conventional controlling system has 8 to 10 recesses formed in the disc 14. However, because of the vibration and impact produced during the drilling operation, a false train of pulses are often produced from the proximity switch 16. The description is now directed to such a false signal.

During the drilling operation, when the bit 10 is rigidly caught by the rock, the bit 10 would be held tightly inside the rock whereas the rod 6 continuously receives impacts and rotating force. In this case, the rod 6, particularly the portion accommodated inside the drill 2 is apt to be vibrated by such rotating force. Accordingly, the disc 14 rigidly connected to the rod 6 is also vibrated. Therefore, the recess facing the proximity switch 16 alternately comes close to and moves away from such switch 16 to produce a false train of pulses from the switch 16. The frequency of such false pulses is in relation to the frequency of the vibration. Similar false pulses are produced by the impact applied to the rod 6.

According to the tests carried out by the present inventor, three different models of rock drilling apparatus TY-1, TY-2 and TY-3 have been examined to find for each model (i) the proper rotational speed of the drill; (ii) the number of false pulses produced per minute by the vibration; and (iii) the number of false pulses produced per minute by the impact. The inner diameter of the impact cylinder used for models TY-1, TY-2 and TY-3 are 120 mm, 110 mm and 90 mm, respectively. The drilling operation is effected on granite with the operative pressure ranged between 3 kg/cm$^2$ to 7 kg/cm$^2$. The results are shown in FIGS. 3a, 3b and 3c.

In FIG. 3a, a region A1 covering 80 to 220 rpm indicates a range of rotation of the rod 6 in which the drilling operation is carried out by the use of model TY-1. Five circle dots A2, A3, A4, A5 and A6 indicate the number of rotation effected by the operative pressure of 3, 4, 5, 6 and 7 kg/cm$^2$, respectively, during no-load operation, that is, when the bit 10 is free from any object. Similarly, for model TY-2, the drilling operation mode takes places in a region B1 covering 50 to 230 rpm while no-load operation mode for the operative pressure of 3, 4, 5, 6 and 7 kg/cm$^2$ are shown by dots B2, B3, B4, B5 and B6, respectively. Likewise, for model TY-3, the drilling operation mode takes place in a region C1 covering 30 to 140 rpm while no-load operation mode for the operative pressure of 3, 4, 5, 6 and 7 kg/cm$^2$ are shown by dots C2, C3, C4, C5 and C6, respectively. Therefore, the available rotational speeds for models TY-1, TY-2 and TY-3 range from 80 to 400 rpm, from 50 to 300 rpm, and from 30 to 260 rpm, respectively.

Therefore, in the case where the disc 14 has eight recesses formed therein, the pulse repetition frequency (PRF) from the proximary switch 16 for models TY-1, TY-2 and TY-3 are in a range which is 8 times the number given above, that is, 640 to 3,200 ppm, 400 to 2,400 ppm and 240 to 2,080 ppm, respectively.

In FIG. 3b, regions A7 and A8 covering from 850 to 3,100 ppm indicate the range of the number of false pulses produced per minute from model TY-1 during the vibration thereof. Similarly, regions B7 and B8 covering from 1,100 to 2,000 ppm indicate the range of the number of false pulses produced per minute from model TY-2 during the vibration thereof. Likewise, regions C7 and C8 covering 700 to 2,150 ppm indicate the range of the number of false pulses produced per minute from model TY-3 during the vibration thereof.

It is to be noted that the vibrations in the regions A7, B7 and C7 take place when the bit 10 is completely stuck in the rock to allow no movement of the bit 10 while the vibration in regions A8, B8 and C8 take place when the bit 10 is stuck in the rock, but can make a slight movement.

In FIG. 3c, a region A9 covering 2,100 to 2,600 ppm indicates a range of the number of false pulses produced per minute from model TY-1 by the impact. Similarly, a region B9 covers 1,800 to 2,400 ppm and a region C9 covers 1,500 to 1,900 ppm for the false pulses produced by the impact in models TY-2 and TY-3, respectively.

As apparent from the result, the problem with the conventional control system described with reference to FIG. 2 is that the train of pulses properly produced as a result of rotation of the disc 14 cannot be distinguished from the train of pulses falsely produced as a result of vibration or impact, since the frequency of both trains of pulses fall approximately in the same region.

Although it is simply suspected that the reduction in number of recesses in the disc 14 accordingly reduces the frequency region of the train of pulses produced thereby, such reduction in number of the recesses lowers the accuracy in the detection of the rotational speed.

SUMMARY OF THE INVENTION

Accordingly, a primary object of the present invention is to provide an improved advance control system for use in a drilling apparatus which detects the rotational speed of the rod in a distinguishable manner with respect to the vibration or impact.

Another object of the present invention is provide an improved advance control system of the above described type which detects the rotational speed of the rod with high accuracy.

A further object of the present invention is to provide an improved advance control system of the above described type which is simple in construction and can readily be manufactured.

In accomplishing these and other objects, a control system for use in a rock drilling apparatus comprises, according to the present invention, a pulse producing means for producing at least one pulse upon completion of each rotation of a drilling rod which is rotatably accommodated in a drilling body, oscillator means for producing a high frequency pulse signal, a counting means for counting the number of high frequency pulses produced during a period defined by pulses produced from the pulse producing means, and control means for controlling the movement of the body in a forward and reverse direction in response to the counted number of pulses.

According to a preferred embodiment of the present invention, the pulse producing means includes a disc having at least one recess and rigidly mounted on the drilling rod for rotation together therewith and a proximity switch positioned closely adjacent the disc for producing a pulse when said recess moves past said proximity switch. The number of recesses may not be limited to one, but may be two, in which case the recesses are formed on the opposite sides of the disc.

According to a further preferred embodiment of the present invention, the control means includes a reference number producing means, a comparator means for comparing the counted number with the reference number and for producing a difference therebetween and means for classifying the difference into one of a plurality of classes.

According to the further preferred embodiment of the present invention, the movement of the body is effected by a feed motor operated by an air pressure and controlled by a valve circuit. This valve circuit provides various pressures to the feed motor with respect to a signal obtained from each of the classes.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
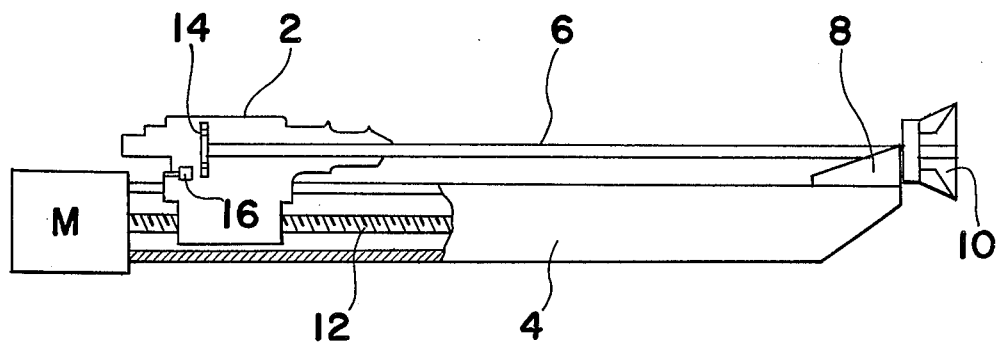
FIGS. 1, 2, 3a, 3b and 3c are drawings which have been already referred to in the foregoing description, FIG. 1 being a side view, with a portion broken away, of a drilling apparatus, FIG. 2 being a block diagram of the conventional control system for controlling the drill, FIG. 3a being a graph showing regions of rotation of the drilling rod in terms of the number of turns per minute, FIG. 3b being a graph showing regions of the number of false pulses produced by the vibrated drilling rod, and FIG. 3c being a graph showing regions of false pulses produced by the impact given to the drilling rod.
Figure 2:
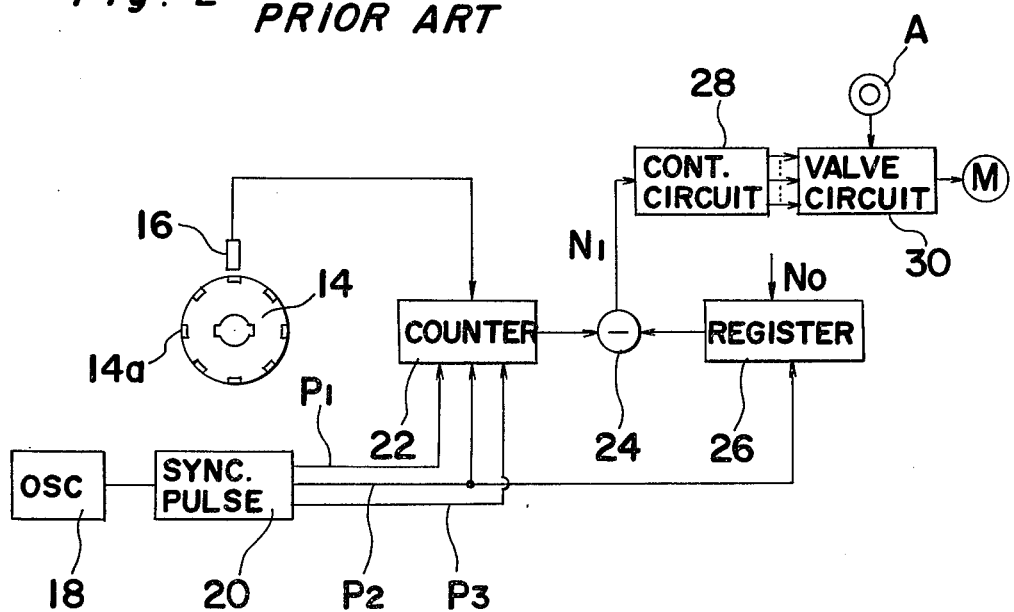
Figure 3A:
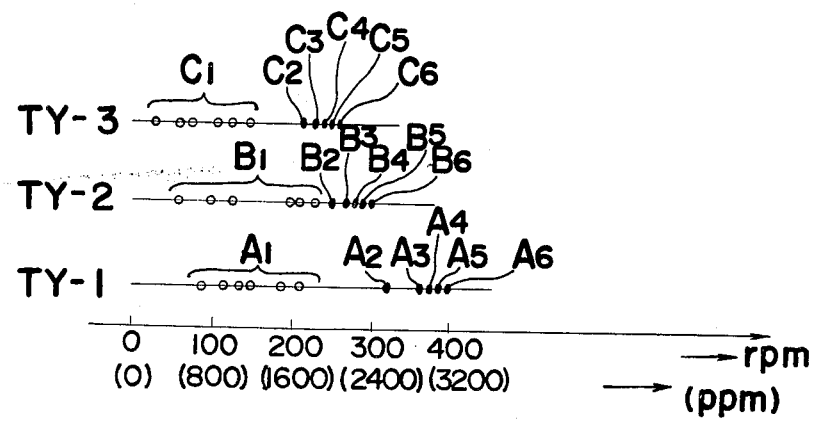
Figure 3B:
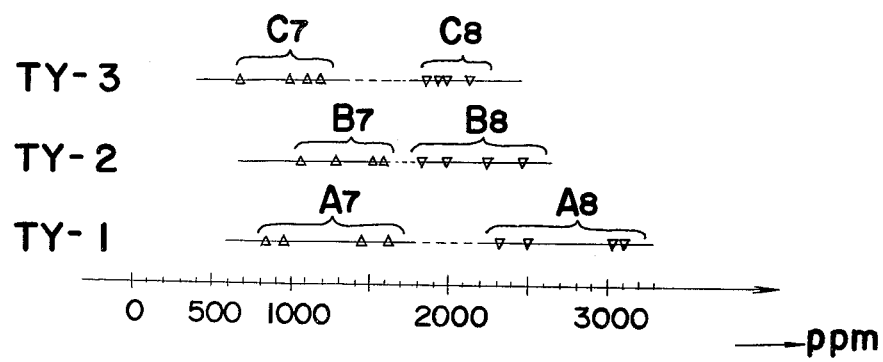
Figure 3C:
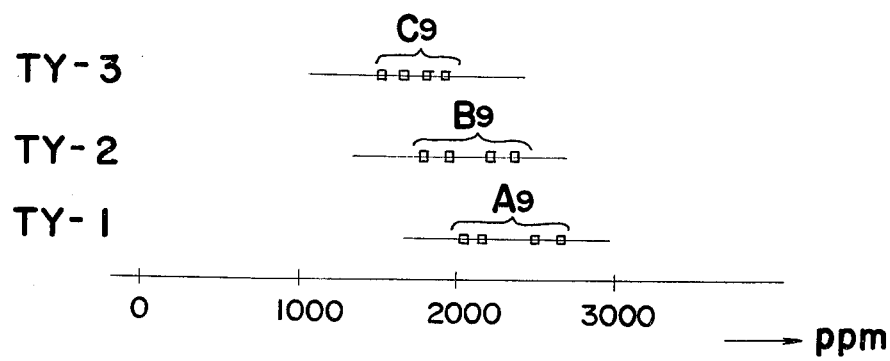

Before the description of the present invention proceeds, it is to be noted that like parts are designated by like reference numerals throughout the accompanying drawings.

Figure 4:
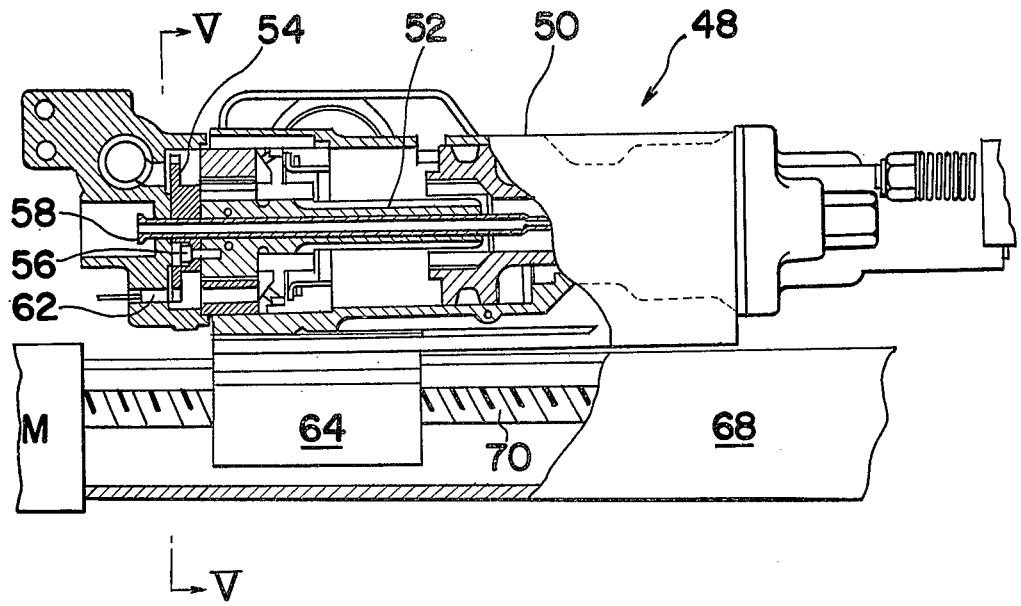
FIG. 4 is a fragmentary view of a drilling apparatus assembled according to the present invention.
Figure 5:
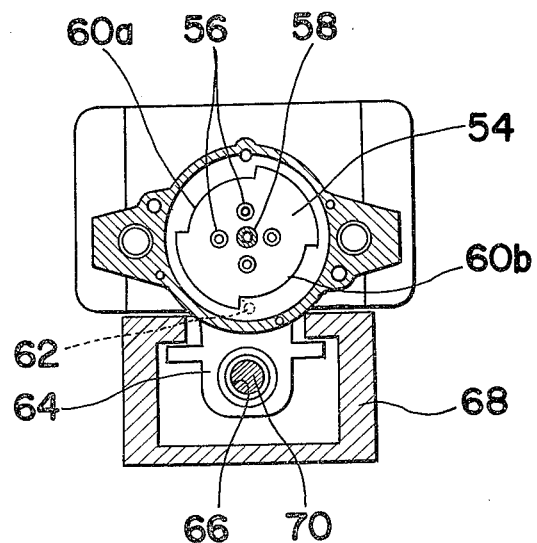
FIG. 5 is a cross sectional view taken along the line V—V shown in FIG. 4.

Referring to FIGS. 4 and 5, there is shown a drill 48 assembled according to the present invention and which comprises a casing 50, a bar member 52 connected to a rod (not shown) and rotatably accommodated in the casing 50 together with the rod. The bar member 52 has a sleeve portion at the left-hand end portion thereof for the connection with a disc 54. The disc 54 is rigidly connected to the sleeve portion of the bar member 52 by nuts 56. A water tube 58 penetrates through the center in the axial direction of the bar member 52 and the disc 54. The disc 54 is formed with two recesses 60a and 60b, each preferably extending 90° around the peripheral edge portion of the disc 54 while the recesses 60a and 60b are 180° spaced from each other about the axis of rotation of the disc 54, as best shown in FIG. 5. A proximity switch 62 of any known type is provided in a back head 50a of the casing and located closely adjacent the peripheral edge of the disc 54 so as to allow the recessed and not-recessed portions of the disc 54 to move past the proximity switch 62. Since the proximity switch 62 is turned on when the not-recessed portion is brought into alignment with the proximity switch 62 and is turned off when the recessed portion 60a or 60b is brought into alignment with the proximity switch 62, the proximity switch 62 produces a train of pulse signals as a result of rotation of the disc 54.

The drill 48 described above is further formed with a leg projection 64 extending outwardly from the casing 50. The projection 64 has a threaded through-hole 66 extending parallel to the bar member 52. The leg projection 64 is slidably accommodated in an elongated cell 68 while the threaded through-hole 66 is engaged to a threaded shaft 70 rotatably extending inside the cell 68. One end of the threaded shaft 70 is connected to a feed motor M which is preferably actuated by an air pressure. The rotation of the threaded shaft 70 in one direction by the motor M causes the drill 48 to advance along the elongated cell 68, while the rotation of the threaded shaft 70 in the other direction by the motor M causes the drill 48 to retreat along the cell 68. The advance control system for the drill 48 will now be described.

Figure 6:
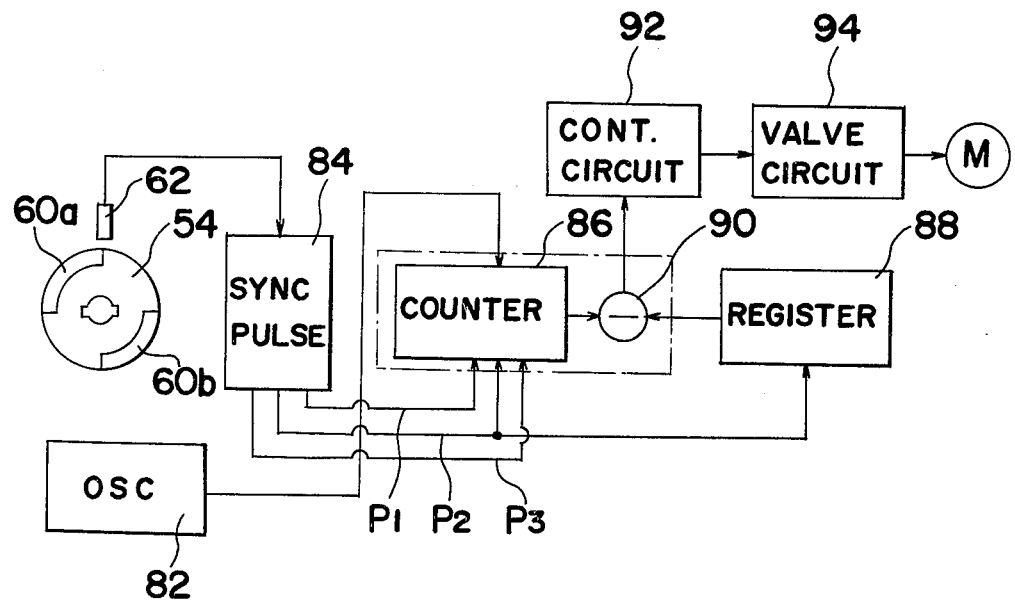
FIG. 6 is a block diagram of a control system of the present invention for controlling the movement of the drill shown in FIG. 4.

Referring to FIG. 6, the control system comprises an oscillator 82 producing high frequency pulses such as at the rate of 9,000 ppm (ppm standing for pulses per minute). The train of pulse signals produced from the proximity switch 62 are applied to a synchronizing pulse producing circuit 84. It is to be noted that the pulse duration of each pulse signal from the proximity switch 62 is very long as compared with that of the pulses from the oscillator 82. The synchronizing pulse producing circuit 84 produces a single shot pulse through a line P1 simultaneously with the leading edge and trailing edge of the pulse from the proximity switch 62 and also produces a single shot pulse through a line P2 immediately after the pulse has been produced on the line P1. The synchronizing pulse producing circuit 84 further produces a single shot pulse through a line P3 immediately after the pulse has been produced on the line P2. These lines P1, P2 and P3 are connected to a counter 86 while the line P2 is further connected to a register 88 preferably formed by a memory means such as read-only-memory. The counter 86 is also connected to the oscillator 82 for counting the number of pulses received from the oscillator 82. The counter 86 is so designed as to start counting the pulses upon receipt of the one shot pulse through the line P3 and finishes the counting upon receipt of the one shot pulse through the line P1. Immediately thereafter and upon receipt of the one shot pulse through the line P2, the counter 86 shifts the counted number N1 of pulses therefrom to a comparator 90 connected thereto. The counted number in the counter 86 is equal to the number of pulses received from the oscillator 82 and is related to the pulse duration of each pulse produced from the proximity switch 62. The one shot pulse on the line P2 is also transmitted to the register 88 to shift a prearranged number No to the comparator 90. The comparator 90 subtracts the number No, obtained from the register 88, from the number N1 obtained from the counter 86 and produces a signal indicative of the difference dN (=N1−No) to a control circuit 92. According to the preferred embodiment, the register 88 is arranged such that the prearranged number No can be selected from a plurality of different numbers which are relative to preferable rotational speeds of the rod or disc 54, such as 10, 120, 150 and 180 rpm.

The control circuit 92 classifies the difference signal into one of a plurality of classes such as eight classes $dN_{-3}$, $dN_{-2}$, $dN_0$, $dN_1$, $dN_2$, $dN_3$ and $dN_4$ and produces a control signal to a valve circuit 94 operated by air pressure to control the feed motor M. The detail of the eight classes and the manner in which the drill 48 is controlled by the feed motor M for each class of difference signal are given in Table I.

In Table I, the difference dN is given in terms of the rotational speed of the drilling rod and, hence, the disc 54. The class $dN_{-3}$ corresponds to the case when the drilling rod rotates at a speed which is much lower than the required speed. In this case, the motor M is rotated in a reverse direction to retreat the drill. The class $dN_{-2}$ corresponds to the case when the drilling rod rotates at a somewhat lower speed than the required speed. In this case, the motor M is stopped.

The classes $dN_{-1}$, $dN_0$, $dN_1$ and $dN_2$ correspond to the respective cases where the drill is advanced to effect the drilling operation. Particularly, the class $dN_{-1}$ corresponds to the case when the drilling rod rotates at a slightly lower speed than the required speed. In this case, the advancing force of the feed motor is decreased at a low value so as to increase the rotating speed of the drilling rod to the required speed. The class $dN_0$ corresponds to the case when the drilling rod rotates at a moderate speed. In this case, the drill is advanced at a moderate speed. The case $dN_1$ corresponds to a case when the drilling rod rotates at a higher speed than the required speed. In this case, the advancing force is increased to a high value so as to decrease the rotating speed of the drilling rod to the required speed. The case $dN_2$ corresponds to a case when the drill is rotated without any load, that is, when the tip of the drill is free from any object to be drilled. In this case, the advancing force is decreased to a low value so as to decrease the rotating speed of the drilling rod to the required speed and to cope with a drilling operation when subjected to a hard rock.

The classes $dN_3$ and $dN_4$ correspond to the respective cases where the proximity switch 62 produces the extremely high number of false pulses therefrom due to the impacts and vibrations. Particularly in the class $dN_3$, the drill is retreated and, in the class $dN_4$, the drill is stopped.

Figure 7:
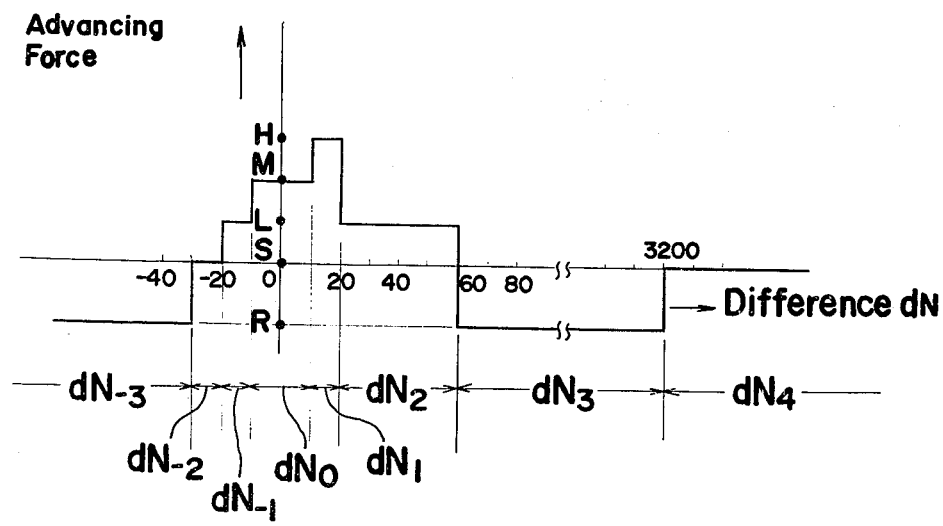
FIG. 7 is a graph showing the relationship between an advancing force and difference dN obtained in accordance with one preferred arrangement as given in Table I.

Referring to FIG. 7, there is shown a graph showing the relationship between the difference dN and the advancing force for the cases described above with reference to Table I.

TABLE I

| Class | Difference dN (N1 − No) | Movement of the drill (Advancing force) |
|---|---|---|
| $dN_{-3}$ | below −30 rpm | Retreat |
| $dN_{-2}$ | −20~−30 rpm | Stop |
| $dN_{-1}$ | −10~−20 rpm | Advance (low value) |
| $dN_0$ | −10~+10 rpm | Advance (moderate value) |
| $dN_1$ | +10~+20 rpm | Advance (high value) |
| $dN_2$ | +20~+60 rpm | Advance (low value) |
| $dN_3$ | +60~+3,200 rpm | Retreat |
| $dN_4$ | above 3,200 rpm | Stop |

TABLE II

| Class | Difference dN (N1 − No) | Movement of the drill (Advancing force) |
|---|---|---|
| $dN_{-3}$ | below −30 rpm | Retreat |
| $dN_{-2}$ | −20~−30 rpm | Stop |
| $dN_{-1}$ | −10~−20 rpm | Advance (low value) |
| $dN_0$ | −10~+10 rpm | Advance (moderate value) |
| $dN_1'$ | +10~+60 rpm | Advance (low value) |
| $dN_2'$ | +60~+3,200 rpm | Retreat |
| $dN_3'$ | above 3,200 rpm | Stop |

Figure 8:
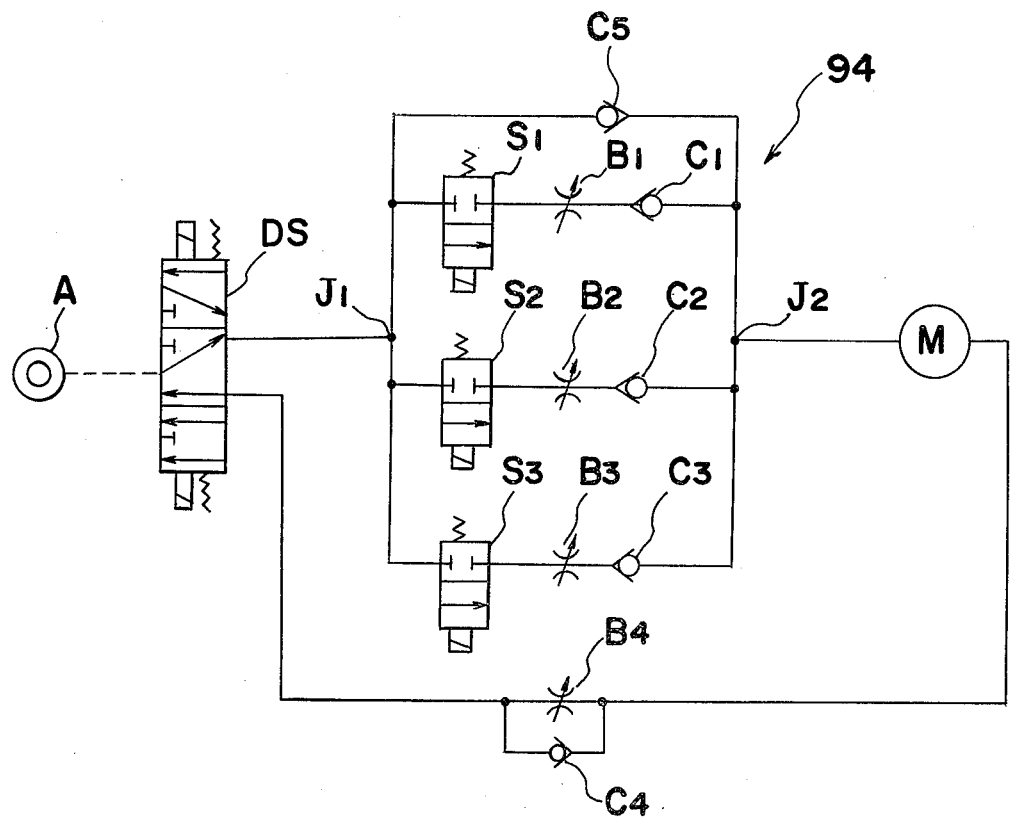
FIG. 8 is a pneumatic circuit diagram coupled with electrically operable valve arrangements and employed in the control system shown in FIG. 6.

Referring to FIG. 8, there is shown a circuit diagram of the valve circuit 94 which is controlled by the signal obtained from the control circuit 92. The valve circuit 94 comprises a double electro-magnetic valve arrangement DS having three alternative positions and a source of air pressure A connected to the valve arrangement DS. One of the two outputs from the valve arrangement DS is connected to a common junction J1 and, in turn, through a one way valve C5 to a common junction J2. Connected between the junctions J1 and J2 are three paths in a parallel relationship to each other. The first path includes a series connection of an electro-magnetic valve S1 having two alternative positions of ON and OFF, a choke valve B1 and a check valve C1. Similarly, the second path includes a series connection of an electro-magnetic valve S2, a choke valve B2 and a check valve C2. Likewise, the third path includes a series connection of an electro-magnetic valve S3, a choke valve B3 and a check valve C3. The junction J2 is connected to one side of the motor M with the other side of the motor M being connected to the other output of the valve arrangement DS through a parallel connection of a choke valve B4 and a check valve C4.

It is to be noted that choke valves B1, B2 and B3 have respective air passages of different cross sections. More particularly the air passage of the choke valve B2 is larger than that of the choke valve B1, and the air passage of the choke valve B3 is larger than that of the choke valve B2.

The operation of the valve circuit 94 is described hereinbelow.

When the drill is in a normal drilling condition, that is, when the difference dN is included in one of the classes $dN_{-1}$, $dN_0$ and $dN_1$, the valve arrangement DS is shifted to a second condition in which the air pressure source A is connected to the common junction J1 through said one output and while the other output of the valve arrangement DS is connected to the other side of the motor M through the check valve C4 for exhausting the air pressure in the other side of the motor. When the difference dN is particularly included in the class $dN_{-1}$, the valve S1 conducts while other two valves S2 and S3 are intercepted for establishing the first path. As a consequence, a comparatively low pressure is supplied to the motor M for advancing the drill at a low value of the advancing force. When the difference dN is particularly included in the class $dN_0$, the valve S2 conducts and valves S1 and S3 are intercepted for establishing the second path. As a consequence, a moderate pressure is supplied to the motor M for advancing the drill at a moderate value of the advancing force. When the difference dN is particularly included in the class $dN_1$, the valve S3 conducts and valves S1 and S2 are intercepted for establishing the third path. As a consequence, a comparatively high pressure is supplied to the motor M for advancing the drill at a high value of the advancing force speed.

When the drill is in a no-load condition, that is, when the difference dN is included in the class $dN_2$, the valve arrangement DS is shifted to the second condition as described above while the valve S1 conducts in a manner described above for establishing the first path for advancing the drill at a low value of the advancing force to effect a gentle contact of the drill with the rock. Such gentle contact prevents the drilling rod from being stuck in the rock or from being undesirably effected by hunting.

When the difference dN is included in the class $dN_3$, that is, when the train of false pulses are produced by the effect of vibration and/or impacts, the valve arrangement DS is shifted downwardly to a first condition for supplying the air pressure from the source A to the motor M through the choke valve B4 in a reverse direction while the junction J1 is connected to the atmosphere.

When the difference dN is included in the class $dN_4$, that is, when the train of false pulses are produced at an extremely high speed by the effect of vibration and/or impacts, the valve arrangement DS is shifted upwardly to a third condition for supplying no air pressure to the motor M while both sides of the motor M are connected to the atmosphere and the drill is stopped for substantially stopping the drilling operation.

When the difference dN is included in the class $dN_{-2}$, that is, when the rotational speed of the drilling rod is very low, the valve arrangement DS is shifted upwardly to the third condition for supplying no air pressure to the motor M while both sides of the motor M are connected to the atmosphere and the drill is stopped for substantially stopping the drilling operation.

Finally, when the difference dN is included in the class $dN_{-3}$, that is, when the rotational speed of the drilling rod is extremely low, the valve arrangement DS is shifted downwardly to the first condition for supplying the air pressure to the motor M in the reverse direction while the junction J1 is connected to the atmosphere for retreating the drill and for preventing the drilling rod from being held in a stuck position.

Figure 9:
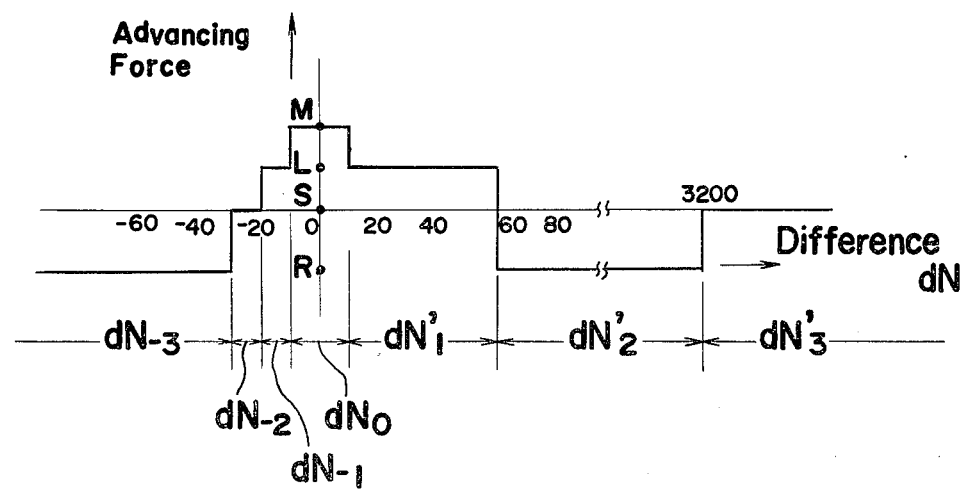
FIG. 9 is a graph similar to FIG. 7, but particularly showing another preferred arrangement as given in Table II.

In the case where the rock is very soft or easy to drill, it is not necessary to provide a high advancing force to the drill. Therefore, it is possible to eliminate the class $dN_1$ from the controlling system. Table II shows the details of the seven classes $dN_{-3}$, $dN_{-2}$, $dN_{-1}$, $dN_0$, $dN'_1$, $dN'_2$ and $dN'_3$ and the manner in which drill 48 is controlled by the feed motor M for each class, and a graph of FIG. 9 shows a relation between the difference dN and the advancing force for the cases shown in Table II.

According to one drilling apparatus controlled in accordance with the Table II, the desired rotational speed of the drilling rod is fixed, for example, at 150 rpm. In this case, when the drill is operated in a normal drilling condition, the proximity switch 62 produces a train of pulse signals having a frequency of about $150 \times 2 = 300$ ppm (ppm stands for pulses per minute). Since the frequency of 300 ppm is much smaller than the frequency range of 1,000 ppm to 3,000 ppm occupied by the false pulses caused by the vibration and impacts, it is possible to distinguish the true pulses caused by the rotation of the disc 54 from the false pulses caused by the vibration and impacts. Furthermore, since the frequency of the pulses from the oscillator 82, such as 9,000 ppm, is much higher than the frequency of the false pulses (1,000 ppm to 3,000 ppm), these pulses from the oscillator 82 can also be distinguished from the false pulses.

Since the rotational speed N of the disc 54 can be expressed as follows:

$$N = 60/nTm \qquad (1)$$

in which n is the number of recesses formed in the disc 54, T is the period of the pulses from the oscillator 82 and m is the number counted by the counter 86, an accuracy ACC of detection of rotation of the disc 54 can be given by the following equation $$ACC = (60/nT) \times \{1/m(m+1)\} \qquad (2)$$

Therefore, it is understood that the detection of the rotation of the disc 54 can be effected with high accuracy with the increase of frequency of the pulses from the oscillator 82, that is, with the decrease of the period T. Furthermore, since the period T can be arranged to be of an extremely small value, it is possible to control the rotation of the disc 54 with a higher accuracy than the conventional system.

Figure 10:
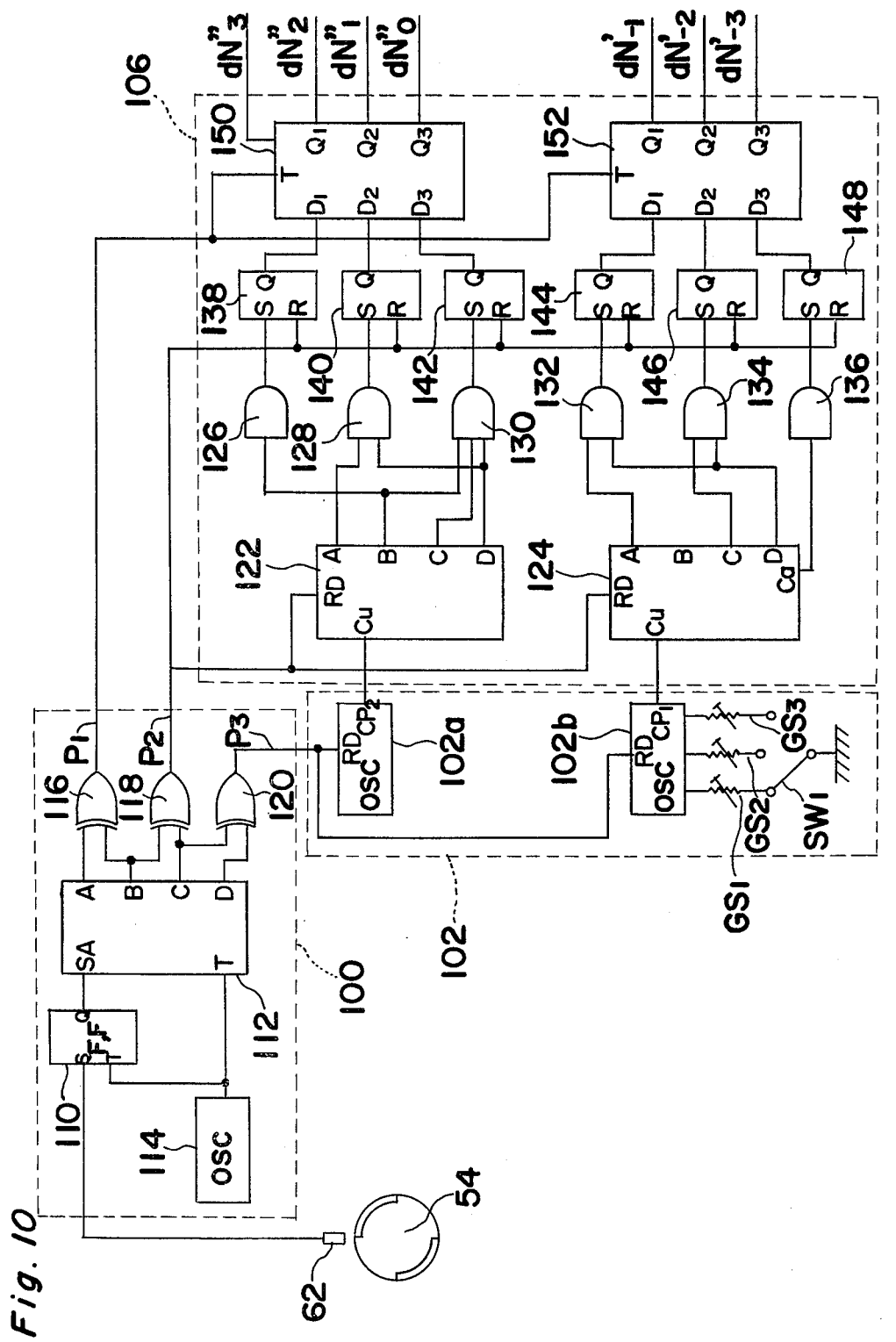
FIG. 10 is a circuit diagram of another control system of the present invention for controlling the movement of the drill shown in FIG. 4.

Referring to FIG. 10, there is shown another embodiment of the advance control system of the present invention which comprises a synchronizing circuit 100, an oscillator circuit 102 including first and second oscillators 102a and 102b and a control circuit 106, each of which is described in detail hereinbelow.

Figure 11:
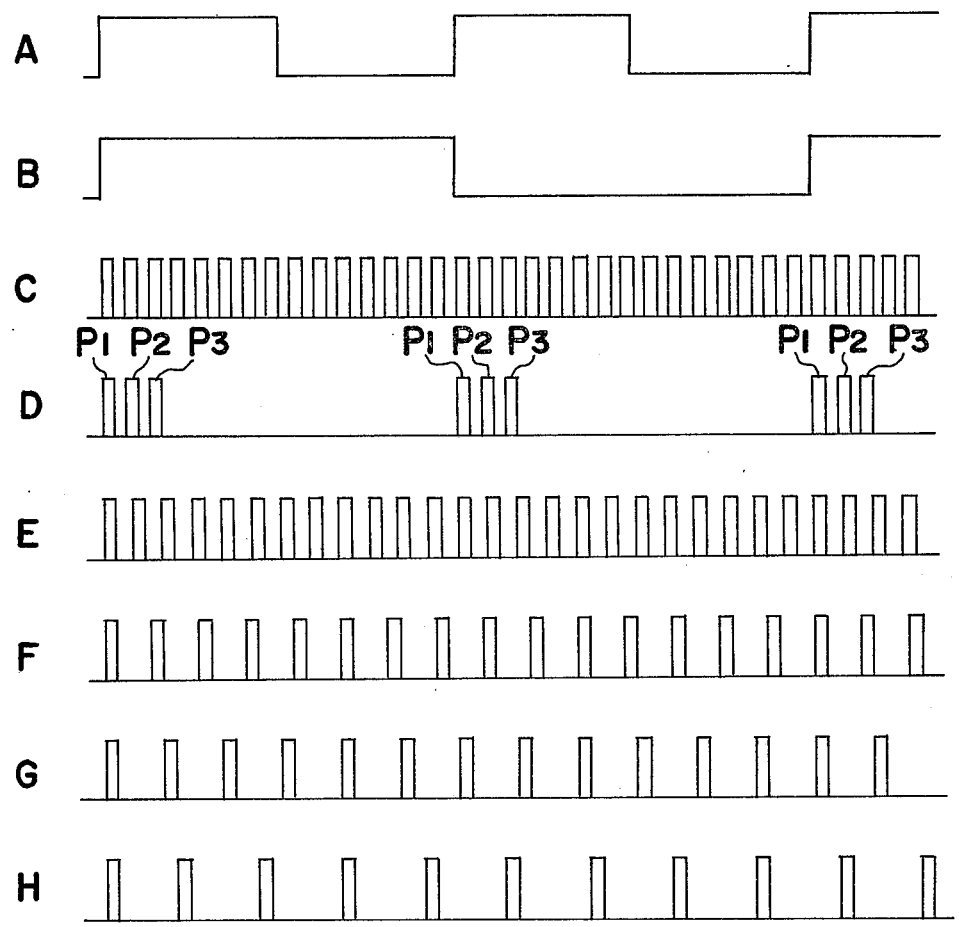
FIG. 11 is a graph showing waveforms obtained at various major points in the circuit shown in FIG. 10.

As shown in FIG. 10, synchronizing circuit 100 comprises a flip-flop circuit 110 having set input S, trigger input T and output Q, a 4-bit shift register 112 having inputs SA and T and outputs A, B, C and D, an oscillator 114 for producing clock signal having a high frequency and three exclusive OR elements 116, 118 and 120. The train of pulse signals (FIG. 11, waveform A) produced from the proximity switch 62 is applied to the set input S of the flip-flop circuit 110 and the clock pulse (FIG. 11, waveform C) produced from the oscillator 114 is applied to the trigger input T of the flip-flop circuit 110. Therefore, the flip-flop circuit 110 produces pulse signal (FIG. 11), waveform (B) for outputting to the shift register 112 which also receives clock pulses from the oscillator 114. Upon receipt of the leading edge of the pulse (waveform B) from the flip-flop 110, the shift register 112 receives the clock pulse (waveform C). Then, the first, second and third clock pulses applied to the shift register 112 are transmitted through the first, second and third exclusive OR elements 116, 118 and 120, respectively. Therefore, three lead wires P1, P2 and P3 from the respective exclusive OR elements 116, 118 and 120 carry pulse signals as shown by the waveform D in FIG. 11.

In the oscillator circuit 102, the first and second oscillators 102a and 102b are actuated to start producing the pulse signal upon receipt of pulse signal from the exclusive OR element 120 through the wire P3. The first oscillator 102a produces pulse signal (FIG. 11, waveform E) having a very high frequency such as 145.8 Hz, whereas the second oscillator 102b produces one of three different pulse signals (FIG. 11, waveforms F, G and H) having lower frequencies such as 40 Hz, 26.7 Hz and 16.6 Hz, respectively. The selection of one pulse signal is carried out by a switch SW1 coupled to the second oscillator 102b. It is preferable to employ variable resistors GS1, GS2 and GS3 in the switch SW1 for a precise adjustment.

Figure 12:
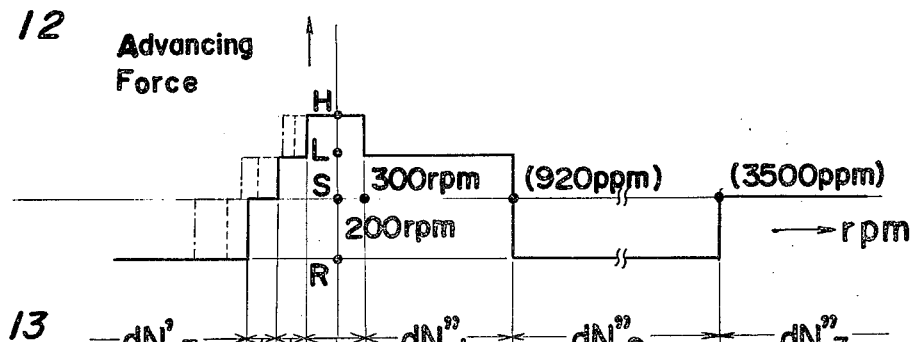
FIG. 12 is a graph similar to FIG. 7, but particularly showing further preferred arrangement obtained according to the circuit shown in FIG. 10.

The control circuit 106 comprises two sets of counters 122 and 124, six AND elements 126, 128, 130, 132, 134 and 136, six flip-flop circuits 138, 140, 142, 144, 146 and 148, and two latch elements 150 and 152. The two sets of counters 122 and 124 and six flip-flop circuits 138 to 148 are reset upon receipt of pulse signal from the second exclusive OR element 118 through the wire P2. The first three sets of the AND elements 126, 128 and 130 are coupled to the first counter 122 in such a manner that the AND element 126 produces a high level signal after the counter 122 has counted two pulses from the oscillator 102a. Similarly, the AND element 128 produces a high level signal after the counter 122 has counted nine pulses and the AND element 130 produces a high level signal after the counter 122 has counted 14 pulses. The remaining three sets of the AND elements 132, 134 and 136 are coupled to the second counter 124 in such a manner that the AND element 132 produces a high level signal after the counter 124 has counted nine pulses from the oscillator 102b. Similarly, the AND element 134 produces a high level signal after the counter 124 has counted twelve pulses and the AND element 136 produces a high level signal after the counter 124 has counted some number of pulses larger than twelve. As apparent from the foregoing, the AND elements 126 to 136 are so arranged as to sequentially produce a high level signal as the number of pulses counted in the counters 122 and 124 increases. Each of the high level signals produced from the respective AND elements is temporarily stored in its respective flip-flop circuit. Upon receipt of a pulse from the exclusive OR element 116 through the wire P1, the signals stored in each of the flip-flop circuits are shifted to inputs D1, D2 and D3 of the respective latch elements 150 and 152 and a signal corresponding to such inputs is outputted from the latch elements 150 and 152. When none of the inputs of the latch elements 150 and 152 receive a high level signal, the output Qo of the latch element 150 produces a high level signal indicative of the class $dN''_3$ shown in FIG. 12. When only the input D1 of the latch element 150 receives a high level signal, the output Q1 of the latch element 150 produces a high level signal indicative of the class $dN''_2$. When the inputs D1 and D2 of the latch element 150 a high level signal, the output Q2 of the latch element 150 produces a high level signal indicative of the class $dN''_1$. When the inputs D1, D2 and D3 of the latch element 150 receive a high level signal, the output Q3 of the latch element 150 produces a high level signal indicative of the class $dN'_0$. In a similar manner, a high level signal on the input D1 of the latch element 152 results in the generation of a high level signal from the output Q1 of the latch element 152; a high level signal on the inputs D1 and D2 of the latch element 152 results in the generation of a high level signal from the output Q2 of the latch element 152; and a high level signal on the inputs D1, D2 and D3 of the latch element 152 results in the generation of a high level signal from the output Q3 of the latch element 152. The high level signals from the outputs Q1, Q2 and Q3 of the latch elements 152 indicate the classes $dN'_{-1}$, $dN'_{-2}$ and $dN'_{-3}$ shown in FIG. 12.

The operation of the circuit shown in FIG. 10 is described hereinbelow.

Upon generation of a pulse from the exclusive OR element 120 through the wire P3, the first and second oscillators 102a and 102b start generating high frequency pulses. These pulses from the oscillators 102a and 102b are counted in the counters 122 and 124 and the result of the counted values are simultaneously stored-in flip-flop circuits 138 to 148 until the exclusive OR element 116 produce a pulse signal through the wire P1. Upon receipt of the pulse from the wire P1, the latch elements 150 and 152 cooperate with each other to produce a signal from one of their outputs indicative of one class. Such a signal is applied to the valve circuit 94 shown in FIG. 8 for controlling the feed motor M. Immediately after the generation of the pulse from the exclusive OR element 116, a pulse is produced from the exclusive OR element 118 through the wire P2 to the reset terminals of the counters 122 and 124 and flip-flop circuits 138 to 148. Immediately thereafter, another pulse is produced from the exclusive OR element 120 for repeating a similar operation.

It is to be noted that the frequency change of the second oscillator 102b by a manual turning of the switch SW1 results in a variation of the range in the classes $dN'_0$, $dN'_{-1}$, $dN'_{-2}$ and $dN'_{-3}$. For example, when the second oscillator 102b produces a pulse signal of the waveform F (FIG. 11), the relationship between the advancing force and the rotational speed of the drilling rod would be as shown by the real line in FIG. 12. On the other hand, when the second oscillator 102b produces a pulse signal of the waveform G or H (FIG. 11), the relationship between the advancing force and rotational speed of the drilling rod would be as shown by the broken line or the single chain line in FIG. 12.

According to the present invention, the proximity switch 62 can be replaced with any other known switch such as the one employing a fluidic sensor which converts the detected air pressure into an electrical signal by means of a piezoelectric transducer.

Figure 13:
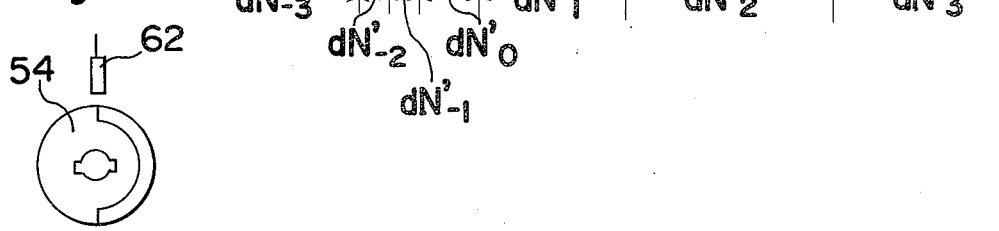
FIG. 13 is diagramatic view of a disc having one recess formed therein.

It is to be noted that the number of recesses formed in the disc 54 is not limited to two, and may be equal to one, as shown in FIG. 13. In this case, the recess is preferably extended 180° around the peripheral edge of the disc 54.

It is also to be noted that the number of classes and the range occupied by each of the classes are not limited to the examples shown above in Tables I and II. They can be varied in consideration of the condition of the rock and the drilling ability of the drilling apparatus.

According to the present invention, since the pressure supply to the feed motor M varies discretely, the advancing force of the drill can be varied in a number of steps with respect to the rotational speed of the drilling rod. Furthermore, the rotational speed of the drilling rod can be maintained constant regardless of hardness of the rock and, yet, the advancing system according to the present invention protects the drilling rod from various aspects. For example, when the rotational speed of the drilling rod increases to the high value corresponding to the case when the drilling rod is rotated without any load, the advancing force is decreased to a low value for preventing the bit from being stuck in the rock or from being undesirably effected by hunting. On the other hand, when the rotational speed of the rod suddenly drops down, the system retreats the drill for preventing the bit from being struck in the rock.

Although the present invention has been fully described by way of examples with reference to the accompanying drawings, it is to be noted that various changes and modifications are apparent to those skilled in the art. For example, the present invention can be employed in a rock excavator. Therefore, such changes and modifications depart from the true scope of the present invention, they should be construed as included therein.

What is claimed is:

1. A control system for use in a drilling apparatus including a drilling rod rotatably accommodated in a drilling body and moving means for advancing and retreating said body in relation to an object, said controlling system comprising:
   pulse producing means for producing one or two pulses upon completion of each rotation of the drilling rod;
   oscillator means for producing a high frequency pulse signal;
   counting means for counting the number of high frequency pulses produced during a period defined by pulses produced from the pulse producing means; and
   control means for controlling the moving means by the counted number of pulses;
   wherein said control means comprises a reference number producing means for producing a reference member, a comparator means for comparing the counted number in the counting means with the reference number and for producing a difference therebetween, means for classifying the difference into one of a plurality of classes, means for producing a class signal indicative of a class in which the difference is classified and control circuit responsive to the class signal for controlling the moving means.

2. A control system as claimed in claim 1, wherein said moving means is operated by air pressure, said control circuit including a valve circuit for supplying air of a predetermined pressure to the moving means for the respective class signal.

3. A control system for use in a drilling apparatus including a drilling rod rotatably accommodated in a drilling body and moving means for advancing and retreating said body in relation to an object, said controlling system comprising:
   pulse producing means for producing one or two pulses upon completion of each rotation of the drilling rod;
   oscillator means for producing a high frequency pulse signal;
   counting means for counting the number of high frequency pulses produced during a period defined by pulses produced from the pulse producing means; and
   control means for controlling the moving means by the counted number of pulses;
   wherein said control means comprises means for classifying the counted number into one of a plurality of classes, means for producing a class signal indicative of the class in which the counted number is classified and control circuit responsive to the class signal for controlling the moving means.

4. A control system as claimed in claim 3, wherein said class signal producing means includes for each class a flip-flop circuit and a latch circuit coupled to the flip-flop circuit.

5. A control system as claimed in claim 4, further comprising a synchronizing circuit for sequentially producing three timing pulses after the starting of the pulse produced from the pulse producing means, a first of the three timing pulses being applied to the latch circuit for the reset of the latch circuit, a second timing pulse subsequent to the first timing pulse being applied to the flip-flop circuit and the counting means for the reset of the flip-flop circuit and the counting means, and a third timing pulse subsequent to the second timing pulse being applied to the oscillator means for the reset of the oscillator means.

* * * * *